United States Patent [19]
Dietz

[11] 3,825,793
[45] July 23, 1974

[54] RASTER CORRECTION CIRCUIT UTILIZING A PARABOLICALLY VARYING LOAD CIRCUIT

[75] Inventor: Wolfgang Friedrich Wilhelm Dietz, New Hope, Pa.

[73] Assignee: RCA Corporation, New York, N.Y.

[22] Filed: Feb. 5, 1973

[21] Appl. No.: 329,617

Related U.S. Application Data

[63] Continuation-in-part of Ser. No. 43,767, June 5, 1970, abandoned.

[52] U.S. Cl. .......... 315/27 GD
[51] Int. Cl. .......... H01j 29/70
[58] Field of Search .......... 315/27 R, 27 TD, 27 GD, 315/28–29, 26

[56] References Cited

UNITED STATES PATENTS

| | | | |
|---|---|---|---|
| 2,726,340 | 12/1955 | Nelson | 315/27 GD |
| 3,571,653 | 3/1971 | Hansen et al. | 315/27 GD |
| 3,715,621 | 2/1973 | Schiess | 315/27 TD |

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

A raster correction circuit for a color television receiver provides side pincushion correction by utilizing a parabolically varying load circuit coupled in parallel relation with the horizontal yoke. In one embodiment, the load circuit includes a capacitor and a transistor driven by a vertical deflection frequency signal to be conductive during a portion of the vertical scan interval coupled across a direct voltage blocking capacitor which is serially coupled to the horizontal output transformer. In another embodiment, an additional winding on the horizontal output transformer is loaded parabolically by the variable loading circuit to provide the desired correction. In a third embodiment, a direct current voltage derived from a winding of the horizontal output transformer serves as the power supply for the vertical deflection stage. The vertical deflection stage loads the horizontal winding in a manner to provide side pincushion correction.

20 Claims, 6 Drawing Figures

RASTER CORRECTION CIRCUIT UTILIZING A PARABOLICALLY VARYING LOAD CIRCUIT

This is a continuation-in-part of application Ser. No. 43,767, now abandoned, filed June 5, 1970, and entitled, "RASTER CORRECTION CIRCUIT," and assigned to RCA Corporation.

The present invention relates to a raster correction circuit and particularly a circuit utilized to correct for side pincushion distortion in a color television receiver.

In modern television receivers utilizing relatively large deflection angle kinescopes to display the transmitted television images, pincushion distortion becomes increasingly noticeable. The present invention addresses itself to the solution of the side pincushion distortion problem caused by the increased distance between the center of curvature of the relatively flat kinescope faceplate and the electron beam deflection center. In prior systems, saturable reactors have been employed to introduce a vertical deflection frequency signal into the horizontal deflection yoke in a manner to provide the desired side pincushion correction. Other systems have employed active devices to vary the deflection current waveform by modulating the signal applied to the horizontal output stage. These techniques proven in the smaller deflection angle systems (such as 90°) become relatively complex and expensive when utilized in a wider angle 110° deflection system. The present invention employs simplified circuitry to achieve the desired correction, thereby providing an economic system. First embodiments of the present invention include a variable conductance device driven by a field deflection frequency waveform to shunt in a parabolic fashion during the line deflection retrace interval a desired amount of line frequency current from the line deflection yoke, thereby correcting for side pincushion distortion.

Another embodiment of the invention includes a source of direct current voltage derived from a winding of the horizontal output transformer, coupled to the vertical deflection circuit. The vertical circuit loads the winding such that side pincushion correction is achieved.

The invention can best be understood by referring to the FIGURES and the accompanying description in which.

Side pincushion distortion, as is well known, manifests itself as a widening of the raster width at the top and bottom portions of a raster and a narrowing of the center portion of the raster, thereby producing a "bowed in" effect. One method for correcting this distortion is to decrease the scan width in a parabolically varying fashion with the greatest decrease occurring at the top and the bottoms of the raster, in effect pulling in the outwardly bowing top and bottom portions of the raster. The circuitry of FIG. 1 accomplishes this in the manner to be described.

Figure 1:
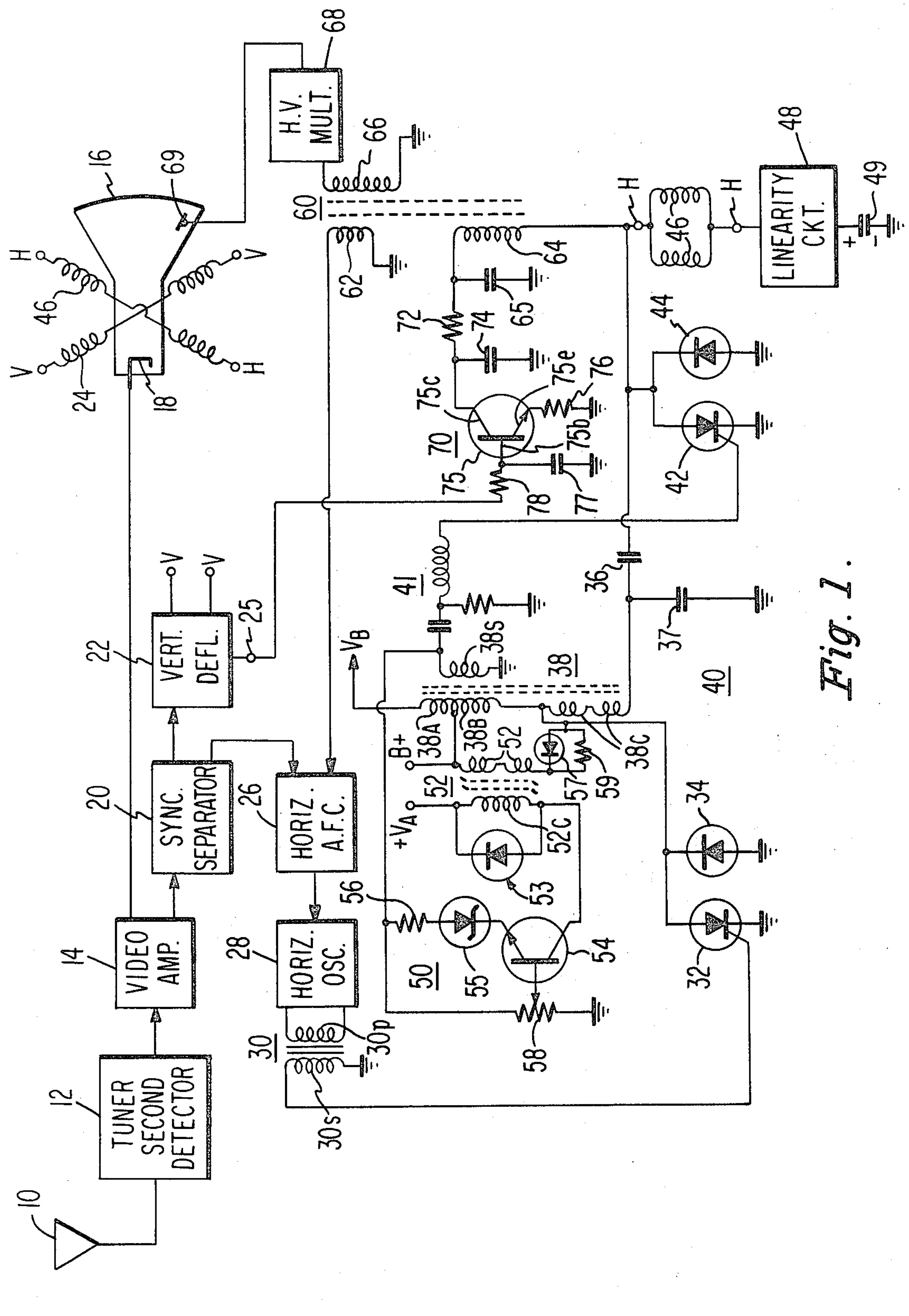
FIG. 1 represents partially in block and schematic diagram form a television receiver including the circuitry of the present invention.

In FIG. 1, an antenna 10 receives composite transmitted television signals and couples them to a tuner second detector stage 12. Stage 12 includes, for example, an R.F. amplifier, a local oscillator, and a mixer for converting the received composite television signals to lower intermediate frequency signals. Stage 12 also includes, for example, intermediate frequency (I.F.) amplification stage for amplifying the lower frequency I.F. signals and an automatic gain control feedback system for maintaining the gain relatively constant as the tuner receives various television channels. Stage 12 further includes, for example, a video detector which derives video frequency information from the composite I.F. signals. The video signals are then coupled to a video amplifier 14 which further amplifies these video signals and couples them to a control element, for example, a cathode 18 of a kinescope 16 which is employed to display the transmitted images. In color television receivers, kinescope 16 may be of the three gun type employing a shadow mask. Chroma information is also derived from the composite television signals and is processed in a chrominance section (not shown) and applied to control grids (not shown) within kinescope 16 to provide color image representation.

A sync separator stage 20 receives composite video and synchronization information from the video amplifier 14 and separates the synchronization information from the video signals as well as separating the vertical synchronization and horizontal synchronization components. The vertical sync signals are then coupled from sync separator 20 to the vertical deflection stage 22 which includes a vertical oscillator to produce field deflection frequency signals which are coupled to a vertical output stage contained in the vertical deflection circuit 22. The vertical deflection circuit 22 applies the required vertical deflection current to a vertical deflection yoke 24 by means of the interconnected terminals V—V. A sawtooth field rate voltage waveform is also developed at an output terminal 25 of the vertical deflection stage 22 and is utilized as the raster correction waveform as explained below.

Horizontal synchronizing signals from sync separator 20 are coupled to a horizontal automatic frequency control stage 26 which may include a phase comparator and a filter network. The sync pulses from stage 20 are compared with signals representative of the line deflection frequency signals developed by the horizontal output stage 40 of the receiver and which are derived from a winding 62 on a horizontal output transformer 60. The output of horizontal A.F.C. stage 26 is coupled to a horizontal oscillator stage 28 and comprises a control signal which is utilized to lock the horizontal oscillator at the desired line deflection frequency. Horizontal oscillator stage 28 develops line frequency signals and couples them to a horizontal output stage 40 by means of a coupling transformer 30 having a primary winding **30*p* and a secondary winding 30*s*.**

Horizontal output stage 40 is a silicon-controlled rectifier (SCR) type which is described in detail in U.S. Pat. No. 3,452,244 assigned to the present assignee. The output stage 40 includes a commutating SCR 32 and diode 34, a trace SCR 42, a damper diode 44. The output stage 40 also includes a commutating inductor **38*c* and capacitor 36 coupling the commutating SCR to the trace SCR. An auxiliary capacitor 37 is coupled from the junction of inductor 38*c* and capacitor 36 to ground. Input power for the system is applied from a power supply (B+) via a parallel combination of an input inductor 38***b* parallelly coupled to a secondary winding 52*s* of a saturable reactor 52. Winding 52*s* has a serially coupled parallel combination of a diode 57 and a resistor 59 as shown. It is seen that the input inductor 38*b* and the commutating inductor 38*c* share a common ferrite core 38. An additional winding 38*a* associated with core member 38 provides a stepped up high voltage illustrated as $V_B$ in the figure which can be employed to supply the operating potential for the video output stage.

A voltage regulator circuit 50, as described in detail in U.S. Pat. No. 3,517,253 assigned to the present assignee, comprises a control transistor 54 having its collector coupled to a positive voltage source ($+V_A$) by means of the parallel combination of a diode 53 and the control winding 52*c* of saturable reactor 52. The emitter of transistor 54 is coupled to a secondary winding 38*s* by means of an avalanche diode 55 and a series coupled resistor 56 as shown in the diagram. A resistor 58 having an adjustable slider is coupled across winding 38*s* and has its wiper arm coupled to the base of transistor 54 to apply a portion of the voltage across winding 38*s* to transistor 54.

A horizontal deflection winding 46 and a serially coupled linearity circuit 48 and S-shaping capacitor 49 is coupled from the trace SCR to ground. A horizontal output transformer 60 has a primary winding 64 coupled from the junction of the trace SCR 42 and the horizontal yoke 46 to ground by means of a D.C. blocking capacitor 65.

Capacitor 65 is further shunted to ground by means of a side pincushion correction circuit 70 which comprises a transistor 75 having base, collector and emitter terminals 75*b*, 75*c* and 75*e* respectively. A resistor 72 couples capacitor 65 to the collector terminal 75*c* of transistor 75. A capacitor 74 is coupled from the collector terminal 75*c* to ground. An emitter resistor 76 couples the emitter terminal 75*e* of transistor 75 to ground. Vertical rate signals from output terminal 25 on vertical deflection stage 22 are coupled to the base terminal 75*b* of transistor 75 by means of a resistor 78. A capacitor 77 is coupled from the base terminal 75*b* of transistor 75 to ground.

Input signals for the trace SCR 42 are provided by a triggering circuit 41 whose operation is described in detail in U.S. Pat. No. 3,638,067 assigned to the present assignee.

A winding 66 associated with the horizontal output transformer 60 develops relatively high voltage pulses which are coupled to a high voltage multiplier circuit 68. Multiplier 68 responds to these pulses to produce the required ultor voltage which is applied to kinescope 16 by means of an ultor voltage terminal 69.

In operation, the horizontal output stage supplies energy to the deflection yoke 46 and to the horizontal output transformer 60 during the second portion of each retrace interval of the deflection cycle. As the trace portion of the deflection cycle is initiated (corresponding to the left portion of the raster), the current in deflection yoke 46 will be at a maximum amount determined by the division of current between the two parallel current paths comprising: (1) winding 46, linearity circuit 48 and capacitor 49; and (2) primary winding 64 of transformer 60 and capacitor 65 and its parallelly coupled pincushion circuit 70. This deflection current will be in a direction to charge capacitor 49 in the polarity illustrated in the figure. As the deflection current, which is conducted by damper diode 44 during the first part of the trace interval, decays toward zero, trace SCR 42 receives a trigger signal from circuit 41 and conducts the yoke current which reverses direction during the second portion of trace. During the latter portion of the horizontal trace interval, capacitor 49 serves as the driving voltage for the yoke current. The maximum value of yoke current in this reverse direction will depend on the charge stored on capacitor 49 during the first part of trace which, in turn, depends on the division of current between the yoke circuit and the winding 64 circuit during the second part of retrace. Since the division of current between the yoke circuit and the winding 64 circuit changes in a parabolic fashion from the top to the bottom of the raster due to the correction circuit 70, pincushion correction is achieved. The division of current between the yoke and winding 64 is accomplished by the circuitry of one embodiment of the present invention by changing the loading across capacitor 65 at the field rate.

Figure 2A:
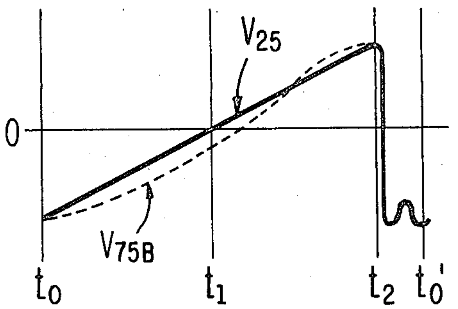
FIG. 2 illustrates waveform diagrams of signals present at various points in the circuitry of FIG. 1.
Figure 2B:
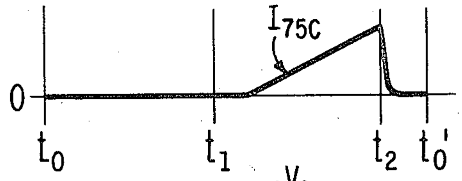
Figure 2C:
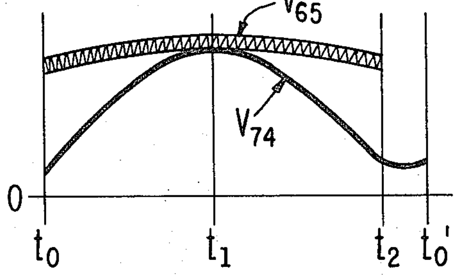

The operation of side pincushion circuit 70 of FIG. 1 can best be understood by referring to the waveform diagrams of FIG. 2. The common abscissa for FIGS. 2A, 2B and 2C represents a vertical scanning interval in which $t_0$ is the beginning of vertical scan or the top of the raster, $t_1$ occurs near the middle of the raster, $t_2$ occurs at the bottom of the raster at the end of the vertical scan, and the interval from $t_2$–$t_0'$ is the vertical retrace period.

In FIG. 2A, the solid line waveform ($V_{25}$) represents the vertical rate sawtooth voltage waveform obtained from terminal 25 of the vertical deflection circuit 22. It is possible to derive such a signal from a number of locations within the circuit as is well known. One such connection may be from a winding on the vertical output transformer (not shown). The dashed line waveform of FIG. 2A illustrates the voltage ($V_{75B}$) which is applied to the base of transistor 75. Essentially, it is the voltage from terminal 25 with some waveshaping accomplished by the resistor 78 and capacitor 77 to cause the base drive signal to transistor 75 to become positive slightly after time $t_1$.

The current waveform of FIG. 2B represents the collector current ($I_{75C}$) flowing in transistor 75.

The voltage waveforms of FIG. 2C represent the voltage across capacitors 65 and 74 as labeled in the figure.

It is noted that the voltage across capacitor 65 ($V_{65}$) contains horizontal frequency components which are represented by the band of high frequency signal components enclosed by an envelope as shown. The voltage $V_{65}$ has a direct voltage level which in one embodiment was approximately +55 volts. The pincushion circuit 70 of FIG. 1 operates in the following manner to provide side pincushion correction by varying the loading across capacitor 65 and thereby shunting a parabolically varying portion of retrace current from the deflection yoke 46 into the horizontal output transformer 64 at the vertical deflection frequency.

At time $t_0$, the base drive voltage $V_{75B}$ shown in FIG. 2A is negative, thereby maintaining transistor 75 nonconductive. At this time, it is seen that the voltage across capacitor 74 is nearly zero while capacitor 65 has a relatively high charge (approximately 50 volts). During the interval $t_0$–$t_1$, current will flow from capacitor 65 at a maximum amount at $t_0$ and in a decreasing fashion into capacitor 74 by means of the interconnecting resistor 72 to tend to equalize their charges. This current flow from capacitor 65 provides a parabolic loading of the horizontal output transformer circuit at the field frequency rate which causes a changing amount of line frequency retrace current to flow into the primary winding 64 from the interval $t_0$–$t_1$ and which decreases toward $t_1$ in a parabolic fashion. The parabolically varying retrace current flow into winding 64 results in a parabolically varying deflection current in the yoke 46, thereby reducing the raster width a maximum amount at time $t_0$ and a decreasingly smaller amount as time $t_1$ is approached. At $t_1$ the voltages on capacitors 65 and 74 are approximately equal and essentially no current is exchanged between these capacitors. During the latter portion of the vertical trace (interval $t_1$–$t_2$), it is again desired to shunt current from capacitor 65 to provide pincushion correction. This is accomplished by driving transistor 75 into conduction during the latter part of the $t_1$–$t_2$ interval. The sawtooth waveform from terminal 25 shown in FIG. 2A as the waveform associated with the symbol $V_{25}$ would cause the transistor 75 to be conductive at approximately $t_1$. It is desired, however, to begin discharging capacitor 65 at a time period somewhat later than $t_1$, since no raster correction is required near the center portion of the raster. The waveform $V_{75B}$ in FIG. 2A accomplishes this delayed turn on of transistor 75 by shaping the voltage from terminal 25 by means of the resistor 78 and capacitor 77. Thus, at some time shortly after $t_1$, transistor 75 becomes conductive as illustrated by its collector current shown in FIG. 2B. The increasing collector current of sawtooth shape discharges capacitor 74 by an increasing amount toward the end of the vertical scan interval, causing more current to be drawn from capacitor 65. Thus, capacitor 65 has an increasing current load impressed across it, and the current division between the horizontal yoke 46 and winding 64 during each horizontal retrace interval is varied to provide pincushion correction. It is noted that the voltage on capacitor 65 decreases approximately 10 percent at the top and bottom of vertical scan due to the loading effect of the side pincushion circuit. The deflection current will vary approximately 7 percent due to the pincushion correction circuit whereas the high voltage applied to the kinescope varies approximately 1 percent and in a direction to assist the pincushion correction.

Figure 3:
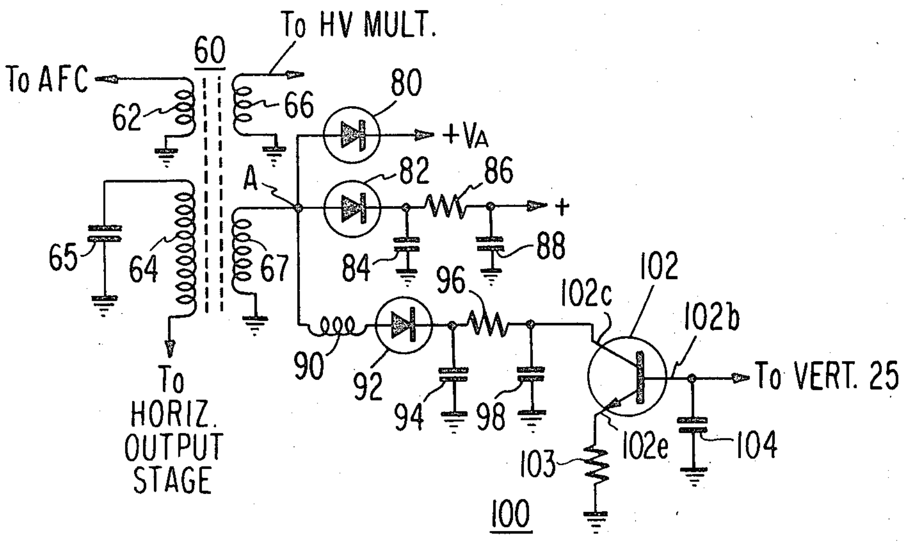
FIG. 3 illustrates in schematic diagram form an alternative embodiment of the present invention.

In an alternative embodiment of the invention as illustrated by the circuitry of FIG. 3, an auxiliary winding 67 associated with the horizontal output transformer 60 is loaded in a parabolic fashion by a pincushion circuit 100. Identical circuit components of FIG. 1 are identified by the same reference numerals in FIG. 3.

It is seen that three separate circuits are coupled to the output terminal A of winding 67. A rectifier 80 provides a voltage $+V_A$ in response to the signals at terminal A which can be employed to supply the voltage regulator stage 50 as shown in FIG. 1.

A low voltage power supply comprising a rectifier 82 and a filter network including capacitors 84 and 88 and a resistor 86 is also coupled to terminal A.

Finally, a side pincushion correction circuit 100 is coupled to terminal A. Inductance 90, rectifier 92 and capacitor 94 provide a peak detector circuit for signals appearing at terminal A. Capacitor 94 is loaded, i.e., current is drawn from it, by the pincushion transistor 102, in conjunction with an integrating circuit 96, 98 in much the same fashion as capacitor 65 is loaded by the circuitry of FIG. 1. Thus, the generally sawtooth voltage applied across capacitor 104 from the vertical deflection circuit will cause transistor 102 to conduct to discharge capacitor 98 during the second portion ($t_1$–$t_2$) of vertical scan.

As with the circuit of FIG. 1, it is desirable to prevent transistor 102 from conducting at the exact center of the raster. The conduction point can be delayed by coupling a small negative bias voltage to the base terminal **102*b* which may be derived, for example, by coupling base terminal 102*b* to the gate of trace SCR 42** by means of a resistance (not shown).

During the first portion of vertical scan ($t_0$–$t_1$) current will flow from capacitor 94 to charge capacitor 98 as transistor 102 is nonconductive. An emitter degeneration resistor 103 is employed in the emitter circuit of transistor 102 to allow the use of transistors having different $h_{FE}$ characteristics. The loading of the peak detection capacitor 94 causes an increased current flow in the primary winding 64 of output transformer 60 and, as with the circuit of FIG. 1, the horizontal deflection current is thereby modulated at the vertical deflection rate to provide pincushion correction. Inductor 90 is employed to time delay slightly the current from winding 67 into capacitor 94. This prevents changes in the ultor voltage due to the loading of winding 67 by pincushion circuit 100 since current is drawn from winding 67 after the multiplier (68 in FIG. 1) ceases conduction during the middle portion of the horizontal retrace interval.

Parameter values utilized in the pincushion circuitry of FIGS. 1 and 3 are as follows:

| | | |
|---|---|---|
| Capacitors | 65 | 0.68 microfarad |
| | 74 | 8 microfarads |
| | 77 | 0.18 microfarad |
| | 94 | 0.33 microfarad |
| | 98 | 8 microfarads |
| | 104 | 0.18 microfarad |
| Resistors | 72 | 220 ohms |
| | 76 | 18 ohms |
| | 78 | 1.8 kilohms |
| | 96 | 150 ohms |
| | 103 | 18 ohms |
| Inductor | 90 | 30 microhenries |

Figure 4:
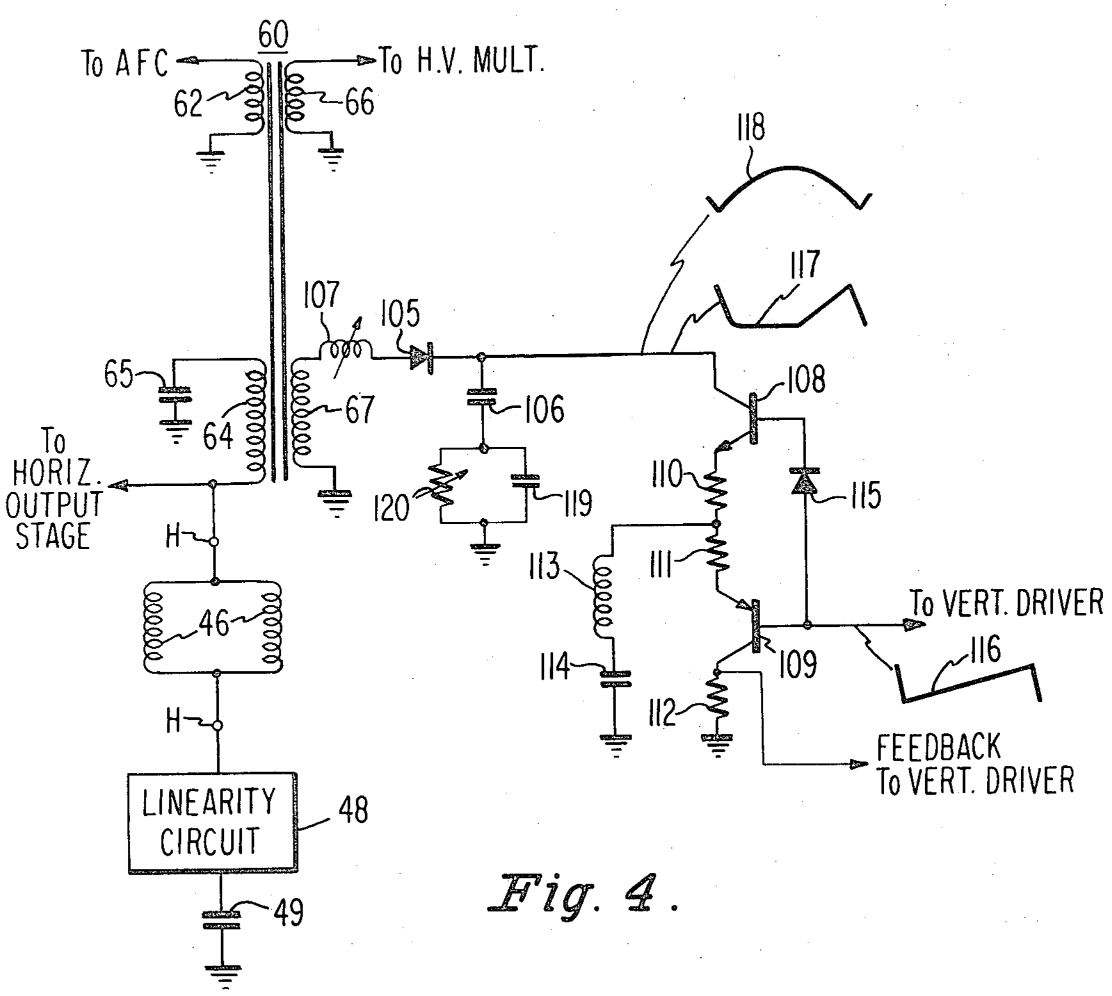
FIG. 4 is a schematic diagram of another embodiment of the present invention.

FIG. 4 is a schematic diagram of another embodiment of the present invention. Those elements performing functions similar to the corresponding elements in FIGS. 1 and 3 are labeled with the same reference numerals.

Auxiliary winding 67 of horizontal output transformer 60 has one terminal grounded and the other terminal connected to a variable inductor 107 which is connected to a diode 105. Diode 105 rectifies the retrace pulse components developed in winding 67. Capacitors 106 and 119 serially connected between the cathode of diode 105 and ground serve to integrate the direct current at the cathode of diode 105. A resistor 120 is in parallel with capacitor 119. The junction of diode 105 and capacitor 106 is coupled to the main current path of series connected, opposite conductivity transistors 108 and 109, which comprise the output stage for the vertical deflection circuit 22 of FIG. 1. Variable resistor 120 in conjunction with capacitor 119 provides an adjustment for phase shifting the current loading winding 67, if needed, to ensure the loading is such as to bring about the desired side pincushion correction of the raster. It should be noted that the values of resistor 120 and capacitor 119 are selected dependent upon the characteristics of the circuit elements such as winding 67 and the vertical deflection circuit components.

The emitter electrode of transistor 108 is coupled through two current limiting resistors 110 and 111 to the emitter electrode of transistor 109. The collector electrode of transistor 109 is connected through a feedback resistor 112 to ground. A vertical deflection yoke 113 is connected by a D.C. blocking capacitor 114 between ground and the output terminal of the vertical deflection output stage at the junction of resistors 110 and 111. The base electrodes of transistors 108 and 109 are coupled together through a diode 115 which reduces crossover distortion in the amplifier. The base electrode of transistor 109 is coupled to a suitable driver stage, not shown, of the vertical deflection circuit 22. The driver stage provides a sawtooth drive current indicated by the waveform 116.

In operation, during the second half of the trace interval, the sawtooth wave 116 causes transistor 108 to conduct while transistor 109 is nonconducting. Current flows from diode 105 and capacitor 106 through transistor 108, resistor 110 and vertical deflection yoke 113 to positively charge capacitor 114. During the first half of the vertical trace interval transistor 108 is nonconducting and waveform 116 causes transistor 109 to conduct. Current flows from capacitor 114 through yoke 113, resistor 111, transistor 109 and resistor 112 to ground. The current drawn from the power supply including diode 105 is illustrated by the normalized current waveform 117. Waveform 118 represents the voltage at the collector of transistor 108. It can be seen that the voltage waveform 118 over a vertical deflection interval approximates a parabola. Thus, winding 67 is loaded in a parabolic manner during each vertical deflection interval. The greatest amount of current is drawn during the beginning and end of each vertical deflection interval. In this manner the horizontal deflection generator supplies more current during these portions of the vertical interval to winding 67 during each horizontal retrace interval, and correspondingly less current to the horizontal deflection winding which is in parallel with winding 67. With less energy stored in the horizontal deflection winding 46 and S-shaping capacitor 49 (FIG. 1), there is correspondingly less current traversing the horizontal deflection winding during the horizontal trace intervals. The horizontal scan is thus shortened at the top and bottom of the raster, resulting in side pincushion distortion correction.

What is claimed is:

1. A raster correction circuit comprising:

a line frequency generator, a line deflection winding coupled to said line frequency generator for providing a path for line frequency scanning current, a field deflection generator, and circuit means coupled to said line deflection winding and to said field deflection generator providing a current path in shunt with said line deflection winding, said circuit means includes an active current conducting device responsive to signals from said field deflection generator and rendered conducting thereby only during a portion of said field deflection interval to vary the impedance of said shunt path and thereby to vary the line deflection current in said line deflection winding at a field deflection rate during successive line deflection retrace intervals in a manner to correct for raster distortion.

2. A raster correction circuit comprising:

a line frequency generator, a line deflection winding coupled to said line frequency generator, a field deflection generator, and circuit means coupled to said line deflection winding and to said field deflection generator providing a current path in shunt with said line deflection winding, said circuit means includes an active current conducting device responsive to signals from said field deflection generator and rendered conducting thereby during a portion of said field deflection interval to vary the impedance of said shunt path and thereby to vary the line deflection current in said line deflection winding at a field deflection rate during successive line deflection retrace intervals in a manner to correct for raster distortion, said circuit means including a horizontal output transformer having a primary winding serially coupled to a point of reference potential through a first capacitor, and a second capacitor coupled through an impedance means to the junction of said first capacitor and said primary winding said second capacitor also being coupled to said active current conducting device for being charged from said first capacitor during a second portion of said field deflection interval and for being discharged through said active current conducting device during said second portion of said field deflection interval.

3. A raster distortion correction circuit comprising:

a deflection circuit for developing line frequency deflection current, means for applying said line deflection current to a line deflection yoke, an output transformer parallelly coupled to said line deflection yoke for developing a relatively high voltage in response to line frequency signals, said transformer including an auxiliary winding, a second deflection circuit for developing field frequency deflection signals, circuit means including an active current conducting device coupled to said second deflection circuit, said device being rendered conducting during a portion of the interval of said field frequency signal for developing a raster correction waveform signal of field frequency periodicity, and a capacitor coupled in series with said auxiliary winding of output transformer and to said circuit means and responsive to said raster correction signals to provide a varying load for deflection current in said output transformer in a manner to provide correction of said pincushion distortion of said raster.

4. In a television receiver employing a retrace driven horizontal deflection output stage which drives a horizontal yoke, a side pincushion correction circuit comprising:

a source of vertical deflection frequency signals, and circuit means including an active current conducting device coupled to said source and to said horizontal deflection yoke, said device being rendered conducting during a first portion of said vertical signal interval and nonconducting during a second portion for providing a varying impedance parallel path for deflection yoke current for varying the peak-to-peak horizontal deflection yoke current in response to said vertical deflection frequency signals in a manner to provide side pincushion correction by varying the maximum horizontal yoke current at the initiation of each trace interval.

5. A circuit as defined in claim 4 wherein said circuit means comprises:

a horizontal output transformer having a winding thereof coupled between the junction of said horizontal output stage and said horizontal deflection yoke and said active current conducting device for providing an additional current path for the total horizontal frequency current developed by said horizontal output stage, said active current conducting means being responsive to said vertical deflection signals to vary the current division between said horizontal yoke and said winding in a manner to produce said pincushion correction.

6. In a television receiver including a horizontal deflection generator including a horizontal output transformer which has a primary winding with a serially coupled capacitor and a horizontal deflection winding parallelly coupled to the series combination of said horizontal output transformer primary winding and said capacitor, a side pincushion correction circuit comprising:

a transistor having base, collector and emitter terminals, an integration circuit coupled from said collector terminal of said transistor and to said capacitor providing a parallel path for current in said capacitor, a source of vertical deflection frequency signals, and means for applying said vertical deflection signals to said base terminal of said transistor to cause the collector current in said transistor to vary in a manner to parabolically vary the voltage across said capacitor, thereby providing side pincushion correction.

7. A circuit as defined in claim 6 wherein said integration circuit comprises:

a second capacitor coupled from said collector terminal to a reference potential, and a resistor coupled from said collector terminal to the junction of said capacitor in series with said primary winding and said primary winding of said horizontal output transformer.

8. In a television receiver including a horizontal output stage having a horizontal deflection winding and a parallelly coupled horizontal output transformer and further including a vertical deflection generator, a side pincushion correction circuit comprising:

an auxiliary winding associated with said horizontal output transformer for providing horizontal frequency pulses, means coupled to said auxiliary winding for peak detecting said horizontal frequency pulses, and variable loading means including an active current conducting device coupled to said peak detector in parallel with said auxiliary winding and to said vertical deflection generator and responsive to vertical rate signals for conducting during a portion of the vertical interval to vary in a parabolic fashion the current in said auxiliary winding, thereby varying the horizontal deflection current in said horizontal deflection winding during successive horizontal retrace intervals in a manner to provide side pincushion correction.

9. A circuit as defined in claim 8 wherein said means coupled to said auxiliary winding for peak detecting said horizontal frequency pulses comprises:

an inductor coupled to said auxiliary winding, a rectifying device coupled to said inductor at a terminal on said inductor remote from said auxiliary winding, and a capacitor coupled from said rectifying device at a terminal on said device remote from said inductor to a reference potential.

10. A circuit as defined in claim 9 wherein said variable loading means includes a transistor having base, collector and emitter terminals wherein said collector-to-emitter current path is coupled in parallel relationship to said capacitor by means of an integration network and wherein said base terminal is coupled to said vertical deflection generator.

11. In a television receiver including a horizontal output stage for developing horizontal deflection yoke current and a vertical deflection generator, a side pincushion correction circuit, comprising:

a variable conductance circuit including an active current conducting device and a capacitor coupled in parallel with said yoke, a control electrode of said device being coupled to said vertical deflection generator, said device being nonconductive during one portion of the vertical deflection interval during which time said capacitor in parallel with said yoke absorbs horizontal deflection current at a decreasing rate and said device being rendered conductive during another portion of said vertical deflection interval in response to vertical deflection rate signals coupled to said control electrode for altering the charge on said capacitor for providing an increasing load of said capacitor for said horizontal deflection current for causing said horizontal deflection current to vary at the vertical deflection rate in a manner to correct for side pincushion distortion.

12. A raster correction circuit comprising:

a line frequency generator;

a line frequency deflection yoke coupled to said line frequency generator;

a line frequency output transformer coupled to said line frequency generator in parallel with said deflection yoke;

rectifying means coupled to a winding of said line frequency output transformer for producing a direct current voltage from horizontal rate pulses in said winding; and a field frequency generator coupled to said rectifying means or obtaining operating current therefrom for loading said winding at the field frequency rate such that current in said deflection yoke varies in a manner to correct for raster distortion.

13. A raster correction circuit comprising:

a retrace driven horizontal deflection circuit including a horizontal deflection rate generator, a horizontal deflection yoke coupled to said horizontal generator, a horizontal output transformer coupled to said horizontal generator in parallel with said horizontal deflection yoke, said horizontal generator providing energy to said yoke and transformer during the retrace interval of each horizontal deflection yoke;

power supply means including rectifying means coupled to said horizontal deflection circuit for providing a source of direct current voltage from the energy in said transformer; and a vertical deflection rate generator coupled to said rectifying means for receiving operating current therefrom, said current loading said transformer such that horizontal rate current in said deflection yoke is altered at the vertical deflection rate in a manner for producing raster correction.

14. A raster correction circuit according to claim 13 wherein said horizontal transformer includes a primary winding coupled to said horizontal deflection rate generator in parallel with said horizontal deflection yoke and an auxiliary winding coupled to said rectifying means.

15. A raster correction circuit according to claim 13 wherein said vertical deflection rate generator includes a push-pull amplifying state coupled to said rectifying means.

16. A raster correction circuit according to claim 15 wherein said push-pull amplifying stage comprises two series connected opposite conductivity transistors.

17. A raster correction circuit comprising:

a retrace driven horizontal deflection circuit including a horizontal deflection rate generator, a horizontal deflection yoke coupled to said horizontal generator, a horizontal output transformer coupled to said horizontal generator in parallel with said horizontal deflection yoke, said horizontal generator providing energy to said yoke and transformer during the retrace interval of each horizontal deflection yoke;

power supply means including rectifying means coupled to said horizontal deflection circuit for providing a source of direct current voltage from the energy in said transformer, and including a phase shifting means for altering the phase of the current loading said transformer; and a vertical deflection rate generator coupled to said rectifying means for receiving operating current therefrom, said current loading said transformer such that horizontal rate current in said deflection yoke is altered at the vertical deflection rate in a manner for producing raster correction.

18. A raster correction circuit according to claim 17 wherein said power supply means includes an amplitude control in series with said rectifying means.

19. In a display system of the type including a cathode ray tube having line and field deflection windings for deflecting the electron beam in said tube, a side pincushion correction circuit comprising:

a line frequency deflection wave generator for driving said line deflection windings;

a field frequency deflection wave generator for driving said field deflection windings;

circuit means including a capacitor coupled to said line frequency deflection wave generator providing a circuit path effectively in parallel with said line deflection winding to be charged by said line frequency deflection wave generator current thereby diverting line frequency current from said line deflection winding; and means including an active current conducting device having a current path connected in parallel with said capacitor, said device responsive to field frequency waves to be normally nonconductive except during the latter portion of the field frequency period to discharge said capacitor.

20. A display system of the type defined in claim 19 wherein said field frequency deflection wave generator includes a complementary symmetry output circuit including a pair of opposite conductivity transistors, and wherein said active current conducting device comprises the one of said transistors that conducts the predominant field frequency deflection current during the latter portion of said field frequency period.

* * * * *

UNITED STATES PATENT OFFICE
CERTIFICATE OF CORRECTION

Patent No. 3,825,793 Dated July 23, 1974

Inventor(s) Wolfgang Friedrich Wilhelm Dietz

It is certified that error appears in the above-identified patent and that said Letters Patent are hereby corrected as shown below:

Column 1, line 64, that portion reading "bottoms" should read -- bottom --. Column 8, line 27, insert comma (,) between "primary winding" and "said second". Column 10, line 59, that portion reading "means or obtaining" should read -- means for obtaining --. Column 11, line 25, that portion reading "state" should read -- stage --.

Signed and sealed this 22nd day of October 1974.

(SEAL)
Attest:

McCOY M. GIBSON JR.
Attesting Officer

C. MARSHALL DANN
Commissioner of Patents